Figure 1:
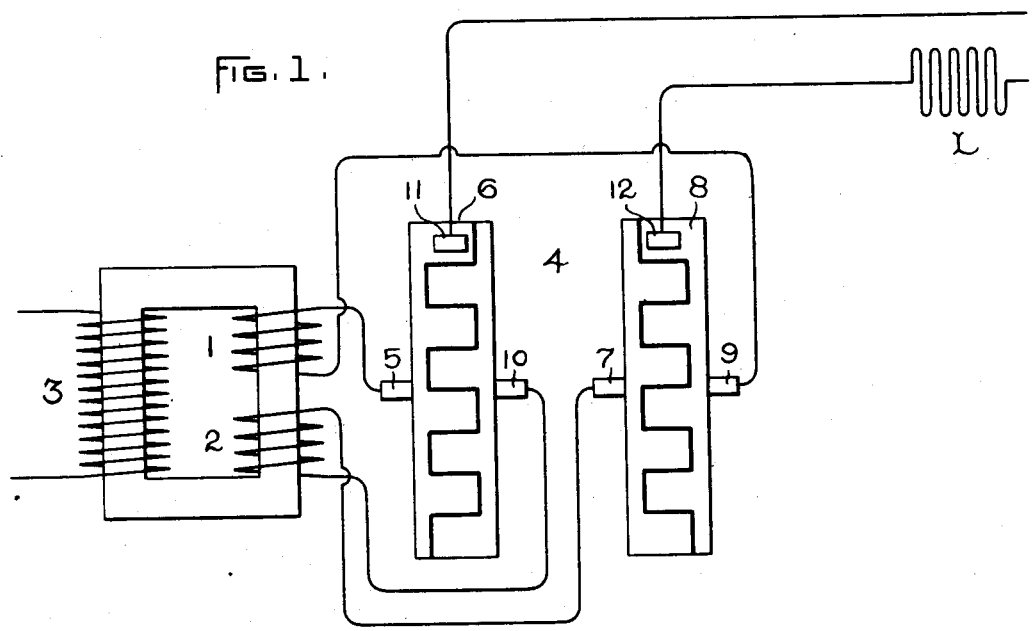

No. 713,284. Patented Nov. 11, 1902.
H. W. BUCK.
RECTIFIER.
(Application filed Oct. 17, 1898.)

(No Model.)

WITNESSES.
A. H. Abell.
A. F. Macdonald.

INVENTOR.
Harold W. Buck,
by Albert G. Davis.
Atty.

UNITED STATES PATENT OFFICE.

HAROLD W. BUCK, OF SCHENECTADY, NEW YORK, ASSIGNOR TO THE GENERAL ELECTRIC COMPANY, A CORPORATION OF NEW YORK.

RECTIFIER.

SPECIFICATION forming part of Letters Patent No. 713,284, dated November 11, 1902.

Application filed October 17, 1898. Serial No. 693,694. (No model.)

*To all whom it may concern:*

Be it known that I, HAROLD W. BUCK, a citizen of the United States, residing at Schenectady, in the county of Schenectady and State of New York, have invented certain new and useful Improvements in Rectifiers, (Case No. 716,) of which the following is a specification.

The present invention relates to a method of rectifying alternating currents, and has for its object the attainment of such advantages as flow from a sparkless commutation of the alternating current.

In rectifying alternating currents a commutator of well-known form is commonly employed, the function of which is to transpose the connections of the alternating-supply circuit with the work-circuit as often as the current in the supply-circuit changes sign, the result of which transposition is that the current in the work-circuit is unidirectional, while that in the supply-circuit is alternating. This transposition or commutation may take place in either of two ways. The supply-circuit may either be wholly disconnected from the work-circuit and then connected thereto, with the terminals reversed, or the commutation may take place by momentarily short-circuiting the supply-circuit, as in the case where the commutator brush or brushes overlap the segments connected to the supply-terminals. In the latter case upon breaking the short circuit by further rotation of the commutator the supply-terminals are connected in the reverse sense to the work-circuit. In either of these cases, however, if the circuit be at all reactive sparking will take place at the time of commutation. In the case where the supply-circuit is first broken before reversing its connections sparking will take place, even though the break be made at the precise instant when the current passing has reached its zero value, and this because of the fact that the impressed electromotive force, being out of phase with the current, is acting at the instant of break and causes the current to jump across the intervening space as soon as the terminals are separated, rather than pass the alternative path formed by the inductive work-circuit. The action is similar in the case where the supply-terminals are short-circuited before being reversed. Upon breaking this short circuit current will jump across the intervening space formed as the terminals are being separated, rather than overcome the impedance of the reactive work-circuit. A rectifying-commutator of the character referred to will not operate sparklessly without adjunctive devices except in the case of small currents flowing in non-reactive circuits.

It is the object of my present invention to do away with this objectionable sparking and to accomplish the same without either breaking the work-circuit or short-circuiting the terminals of the supply-circuit. In carrying out this object I make use of a plurality of equal and similar sources of alternating electromotive force, preferably of such nature that the electromotive force of each source is in the same phase. One of these sources $a$ is first connected into the work-circuit, and after operating until its electromotive force has passed through its predetermined range and becomes zero another source $b$, with its terminals reversed, is then connected into the work-circuit in parallel with the first source. Upon the hypothesis that the work-circuit is reactive the current in the source $a$ will not follow the impressed electromotive force, but will either lag behind or be advanced in phase with respect to the impressed electromotive force, so that when the impressed electromotive force becomes zero there will at that instant be a current flowing in the source $a$ of a value depending upon the amount of reactance. The second source of electromotive force $b$ is connected with the first in a direction such as to oppose a continuation of the flow of current in the first coil in its original direction after its impressed electromotive force has changed sign. It should be remarked that the two sources of electromotive force, although in parallel when considered with respect to the work-circuit, are in series when considered with respect to each other. If the circuit of the first source $a$ be interrupted within the interval occurring between the instant when its impressed electromotive force becomes zero and when its current becomes zero, an induced electromotive force in the same direction as the current will be produced of a value roughly proportional to the value of the current. Within the interval mentioned the current of the first source $a$ decreases to zero, while the impressed electromotive force of the second source $b$ increases from zero. A point may therefore be found where the induced electromotive force, due to disconnecting the source $a$ at the value which its current then has, is exactly equal and opposed to the resultant of the impressed electromotive forces of the sources $a$ and $b$ or, in other words, to the impressed electromotive force in the local circuit. If at this instant the terminals of the first source be disconnected, no sparking will take place, because of the balanced electromotive forces then existing.

Although I have described above a mode of action which I believe to be characteristic of an apparatus constructed in accordance with my invention, I do not desire to be limited thereto, since I am aware that in the operation of all such devices many modifying actions may arise to alter or qualify their modes of action. I find in practice, however, that with an apparatus constructed according to the manner hereinafter described it is possible to prevent sparking in commutating alternating current into direct current, and this I consider conclusive of the utility of my invention, whatever the theory may be as to the mode of action of the same.

Acting on the principle outlined, my invention consists in connecting one source of electromotive force $a$ to the work-circuit before another source $b$ is disconnected therefrom and causing the disconnection to take place at an instant such that the electromotive force due to disconnecting the source $a$ is approximately equal to the impressed electromotive force in the local circuit. This mode of action will be more readily understood by considering the same in connection with the following description of the apparatus for carrying it out.

That specific embodiment of my invention which I have found it most advantageous to employ I have hereinafter described in connection with the accompanying drawings, while the various features of novelty which constitute my invention I have distinctly and particularly pointed out in the accompanying claims.

Figure 2:
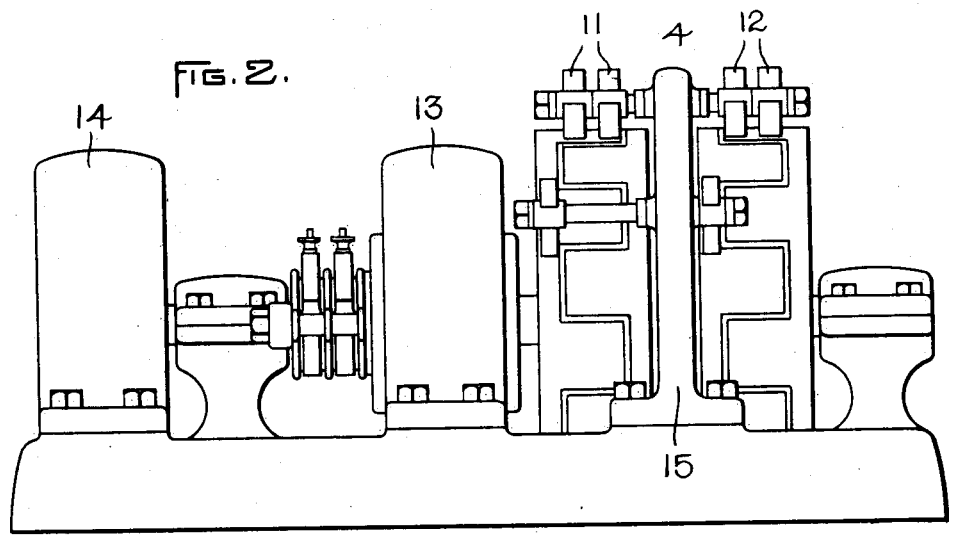

Figure 1 is a diagrammatic representation of the circuits of my improved rectifying device, and Fig. 2 is a view in side elevation of the apparatus employed.

The form of the invention shown in the drawings comprises two similar sources of electromotive force adapted to be alternately connected to a work-circuit, with means for opposing one electromotive force to the electromotive force existing between the terminals of the other source of electromotive force at the instant of commutation. As shown in the drawings, the electromotive forces are derived from two independent symmetrical transformer secondaries 1 2 receiving their energy from a single primary winding 3. It is obvious, however, that independent transformers or independent generators might be used. The terminals of the secondary coils are led to a special commutating device 4, which acts to alternately connect the windings to a work-circuit in such a way that one set of terminals is not disconnected until the connections for the other set of terminals are made.

In the diagrammatic representation in Fig. 1 the terminal 5 of one source is permanently connected, through sliding contacts or otherwise, to one side of an ordinary rectifying-commutator 6. The corresponding terminal 7 of the other source is connected in similar manner to one side of a second rectifying-commutator 8. The remaining terminal 9 of the first source is connected to the other side of the rectifying-commutator 8. In like manner the remaining terminal 10 of the second source of electromotive force 2 is connected to the other half of the rectifying-commutator 6. It will thus be seen that each source of electromotive force has one terminal connected to one commutator and the other terminal to another commutator. The commutators revolve in fixed relation to each other, and two brushes 12 and 12 are arranged to bear thereon in such a way as to make contact with those segments of the commutators which are in connection either with one source of electromotive force or the other. Thus, as shown in the drawings, the work-circuit through the brushes 11 and 12 is in connection with the terminals of the transformer-coil 1. The other transformer-coil 2 is at this time on open circuit. As the commutator revolves the brushes 11 and 12 pass simultaneously from one set of segments to the next. The work-circuit is then in connection with the coil 2, while the coil 1 is open-circuited. The sparking which would ordinarily occur in interrupting an electric current is in this case prevented by proportioning the parts so that the brushes 11 and 12 bridge over the space between adjacent segments in passing from one to the other. By thus simultaneously bridging over adjacent segments by the brushes 11 and 12 at the instant of commutation it will be seen that the terminals of the two coils 1 and 2 will be connected, so that the impressed electromotive forces at their terminals are in series with each other. Thus if the brush 11 bridge over the insulating-space between segments it will be in connection simultaneously with the terminals 5 and 10 of the coils 1 and 2, respectively. In like manner the brush 12 will be in connection at the same instant with the remaining terminals 7 and 9 of the transformer-coils. Terminals of opposite polarity are thus connected together. If the work-circuit be absolutely non-reactive, the current will be in phase with the impressed electromotive force, and zero-current and zero electromotive force will thus occur at the same instant. Sparkless commutation may in this case be secured by transposing the terminals at the instant when the current is zero by the use of very narrow brushes, since at this instant there is no electromotive force acting. In practice, however, an absolutely non-reactive circuit is seldom if ever met with, so that the brushes must have a certain finite width in order that the circuit of each source may not be opened until a short time after the other source is connected in for reasons fully explained above. The position of the brushes to accomplish this result may be found by trial and will vary, depending on the nature and amount of reactance in circuit.

Fig. 2 shows the apparatus as arranged in practice. The rectifying-commutators in this case are driven by a synchronous motor 13, which has the same number of poles as the segments on each commutator. The brushes 11 and 12 thus bear on corresponding segments during one-half a period, the connections with the work-circuit being reversed during the succeeding half-period, and thus changing and alternating into a pulsating electromotive force. In order to bring the synchronous motor up to speed, a suitable direct-current motor 14 may be employed in a manner well understood. For convenience the entire apparatus may be mounted on a single base, which in addition to the parts described carries a semicircular support 15 for the commutating-brushes. The position of the brushes may be adjusted in any suitable manner—as, for instance, by sliding them through the holders. Each of the collecting-brushes 11 12 preferably consists of several component brushes, and by staggering the latter or adjusting one in advance of another I am enabled to obtain the effect of a brush of variable width. This means of adjustment I consider important, since it enables the attainment of the ideal condition under which each source of electromotive force is connected into circuit at fixed times corresponding to the instants the impressed electromotive forces are zero, while disconnection of the same takes place at variable intervals thereafter so chosen as to result in a suppression of sparking.

In practice it is found convenient to include a self-induction or reactive device L in the work-circuit in order to smooth out the rectified current and prevent too violent fluctuations thereof.

What I claim as new, and desire to secure by Letters Patent of the United States, is—

1. The method which consists in alternately connecting two sources of alternating electromotive force of the same phase to a work-circuit and disconnecting one of the sources from the work-circuit after the other is connected thereto.

2. A method of disconnecting a source of periodically-varying electromotive force from a work-circuit, which consists in first connecting it to another source of periodically-varying electromotive force of like phase, and then disconnecting it from said work-circuit.

3. The method of commutating current from a plurality of sources of variable electromotive force which consists in alternately opposing the electromotive force of one source to the reactive electromotive force of another source.

4. The method which consists in alternately connecting a plurality of sources of alternating electromotive force of the same phase to a work-circuit at overlapping time intervals.

5. The method of obtaining a pulsating current from two sources of periodically-varying electromotive forces of the same phase, which consists in alternately connecting each source to a work-circuit, each source being connected to the work-circuit before the other source is disconnected therefrom.

6. The method of producing a pulsating current, which consists in impressing an alternating electromotive force on a work-circuit during approximately a semiperiod and neutralizing the unbalanced electromotive force existing at the instant of commutation by opposing thereto an independent, periodically-varying electromotive force having a suitable value.

In witness whereof I have hereunto set my hand this 13th day of October, 1898.

HAROLD W. BUCK.

Witnesses:
  B. B. HULL,
  EDWARD WILLIAMS, Jr.